March 16, 1954 G. VAN ZALE 2,672,583
VOLTAGE REGULATOR FOR GENERATOR CHARGING BATTERIES
Filed Nov. 3, 1950 3 Sheets-Sheet 1

INVENTOR,
George Van Zole.
BY
Frank C. Learman.
ATTORNEY

March 16, 1954 G. VAN ZALE 2,672,583
VOLTAGE REGULATOR FOR GENERATOR CHARGING BATTERIES
Filed Nov. 3, 1950 3 Sheets-Sheet 2
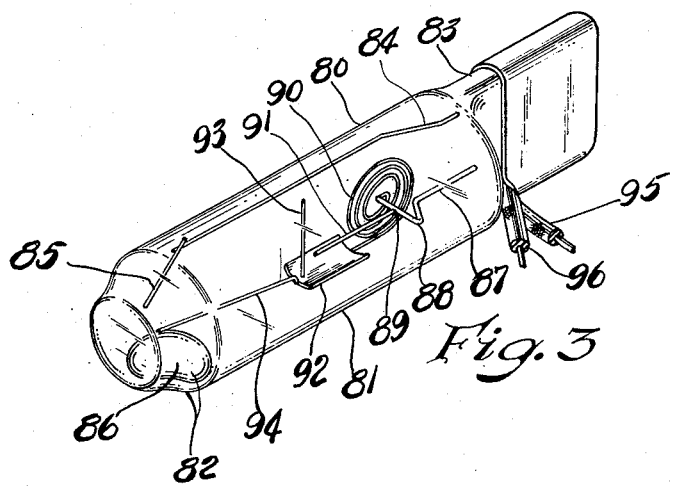
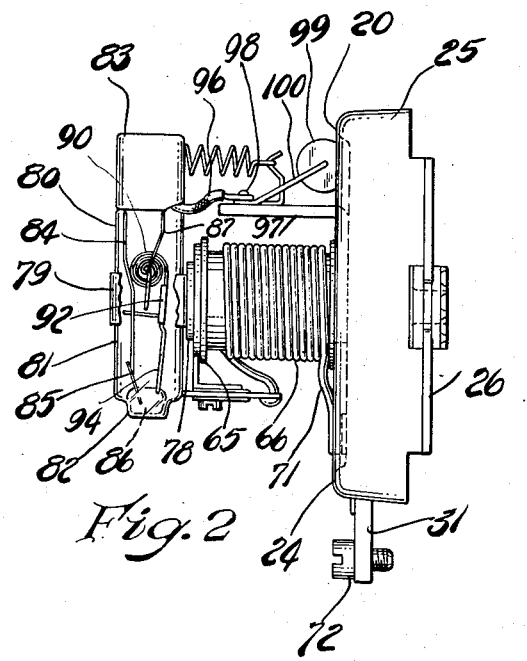
INVENTOR.
George Van Zale.
BY Frank C. Fearman
ATTORNEY

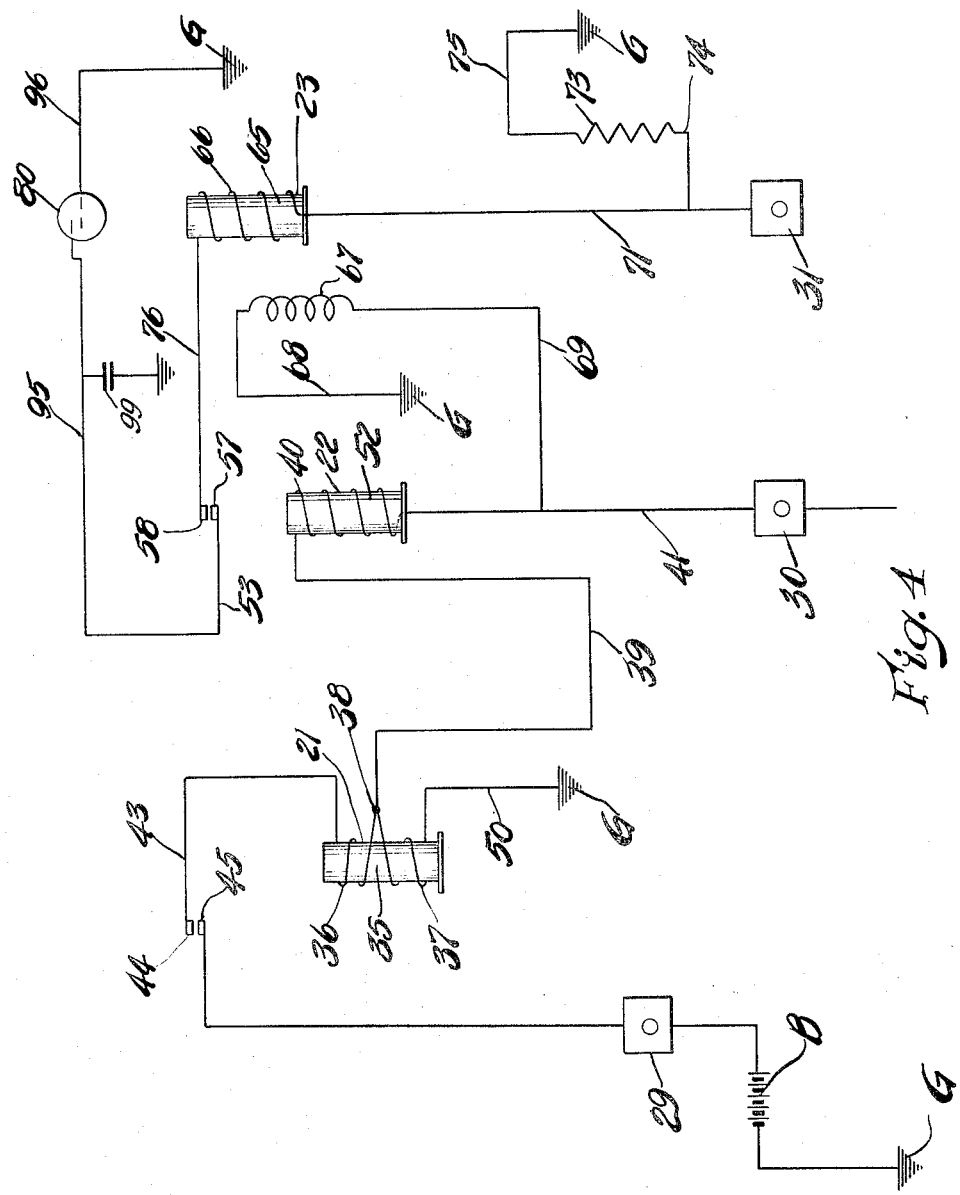

Patented Mar. 16, 1954

2,672,583

UNITED STATES PATENT OFFICE 2,672,583

VOLTAGE REGULATOR FOR GENERATOR CHARGING BATTERIES

George Van Zale, Bay City, Mich.

Application November 3, 1950, Serial No. 193,937

8 Claims. (Cl. 320—32)

The present invention relates to improvements in voltage regulators for battery charging generators, and more particularly to a constant voltage vibratory regulator for use in connection with shunt wound two and three brush battery charging generators as commonly used in present-day motor vehicle battery charging systems.

One object is to provide a constant current vibratory regulator for maintaining the generator output voltage substantially constant in order to force more current through the battery resistance and thus compensate for current being used when such devices as radios, lights and heating equipment are placed in circuit with the battery, and which normally causes the voltage of the battery to drop.

Another object is to provide a voltage regulator having a magnetically operated liquid contact switch for intermittently interrupting the external circuit of the generator, and interposing resistance in the circuit so that said external circuit may be regulated in such a manner as to produce a constant generator voltage output.

Another object is to provide a voltage regulator having a magnetically operated liquid contact interrupter which will operate effectively over long periods of time, and will not create resistance in the field circuit of the generator through long use, since the contact will not become pitted, dirty or corroded and thus, will eliminate resistance in the external generator field circuit at the moment when the interrupter is closed and the contacts are in engagement to connect the external circuit to the ground connection.

Another object is to provide a constant voltage regulator having a sealed-in liquid contact switch for interrupting the series winding of the regulator which is under the influence of the magnetism produced by said winding in such a manner as to shunt a resistance element in the external circuit when the contacts are interrupted or broken by the magnetic attraction created by the series winding on the control magnet.

Another object is to provide a constant voltage regulator having a sealed-in liquid contact magnetic circuit interrupter which is supported on the core of the regulator magnet in such a manner that it may be rotated or moved longitudinally and thereby adjust the voltage setting of the regulator. This is accomplished by moving the armature portion of the liquid contact circuit interrupter various distances from the core of the control magnet and thus increase or decrease the air gap therebetween.

In present-day voltage regulators as used for controlling the generator output for storage battery charging systems of motor vehicles, a magnetic core is provided with voltage and series windings which are connected to the output and field terminals respectively of the generator. The series winding is connected to a vibratory switch arm, and a resistance element has one end connected to the series winding and its opposite end connected to the ground connection of the system. When the voltage output of the generator reaches a predetermined value, the magnetism of the core is increased, which causes the switch arm to be attracted and thus separate a pair of contact buttons, one of which is mounted on the switch arm and the other fixed to a support on the regulator. When the contacts separate, the resistance is thus placed in the field circuit and the generator output is reduced. The contact buttons open and close the circuit many times a second in order to maintain the voltage output of the generator substantially constant. However, through long use, the contact buttons become pitted through arcing and in addition become soiled from dirt and grease to such an extent as to create resistance in the series winding of the regulator when the contacts are in their closed position. This increase in resistance in the external circuit reduces the generator output to such a point that the voltage regulator will not operate properly. This is due to the fact that the voltage winding will not produce sufficient magnetic pull and cause the contacts to separate at the voltage setting value of the regulator, and as a result, at certain speeds, the generator output will exceed the voltage setting value before the contacts will be separated which causes a surge in the current being supplied to the battery.

Thus, with increase voltage being supplied to the battery such electrical devices as radios, heaters and lamps will momentarily be energized to a greater extent which will cause the radio volume to increase and similarly, will cause the intensity of the lights to increase. After this voltage rise the voltage winding of the regulator will cause the contacts to separate to restore the voltage output of the generator to its set predetermined value. Thus, such exernal devices as radios and the like will no longer be supplied with current in such a manner as to produce smooth and efficient operation thereof, and when it is attempted to adjust the voltage regulator by increasing or decreasing the spring tension on the contact arm the voltage regulator will operate less efficiently.

To overcome the above objections and disadvantages, and to maintain the voltage supply to the battery constant within predetermined limits or a set value, a magnetic liquid contact circuit interrupter is placed in series with the series winding of the voltage regulator core with the contacts enclosed and sealed in a chamber which thus prevents arcing and eliminates resistance in the external generator system or circuit created by said arcing in conventional voltage regulators as above explained. Thus, the resistance of the sealed-in liquid contacts will remain constant and the external field circuit of the generator will be controlled more accurately so that when electrical equipment is placed in the battery circuit, they will not fluctuate by reason of the fact that the constant voltage supplied to the battery will overcome the resistance thereof and compensate for the current used for the electrical equipment in the battery circuit.

In addition, the sealed-in liquid contact magnetic switch may be adjusted by simply turning or sliding the same in its support so that the voltage setting of the regulator may be adjusted to a predetermined voltage value more closely approximating the desired generator voltage output. In present-day voltage regulators such voltage settings exceed the desired generator output voltage by at least one volt.

It is also to be pointed out, that by eliminating the resistance caused by arcing of the contact points in the voltage regulator interrupter, the generator charging rate will be maintained such as to enable the battery to receive a charge depending upon the demands placed thereon, and that the battery will not eventually become discharged or run down through faulty operation of the voltage regulator.

Other objects and advantages of the invention will become apparent during the course of the following description of the accompanying drawings, wherein:

Figure 2 is a side elevational view of the voltage regulator illustrating the sealed-in liquid contact circuit interrupter and showing the manner in which the armature on the movable contact thereof is positioned for being influenced by the magnetic flux of the magnet.

Figure 1:
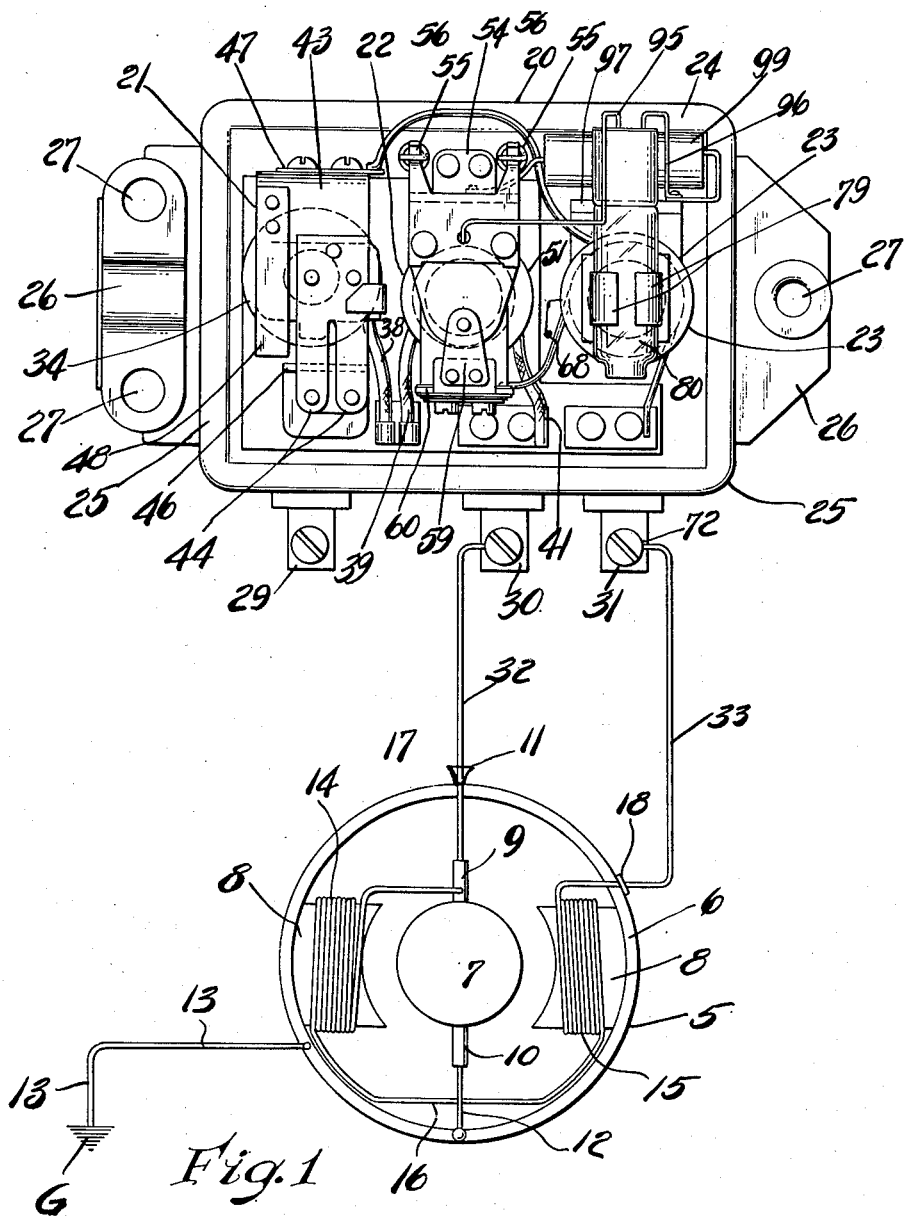
Figure 1 is a top elevational view of a three unit vibratory generator regulator illustrating the generator diagrammatically, and the various connections between the generator and the regulator.

Figure 3 is a perspective view of the sealed-in liquid contact magnetic circuit interrupter illustrating the movable contact, and the manner in which it is yieldingly supported on a coil spring attached to one of the electrode elements, and Figure 4 is a diagrammatic view showing the circuit wiring for a three unit generator regulator, including a reverse current cutout, a current regulator and a voltage regulator.

In the drawings, and more in detail, attention is first directed to Figure 1 wherein there is shown a vibratory three unit regulator for a shunt wound two brush type generator, generally designated 5. While the invention is described in connection with a shunt wound two brush type generator, it is pointed out that it can be effectively employed in connection with a three brush generator as well. The generator 5 includes a conventional frame 6 having an armature 7 and opposed pole pieces 8. A pair of brushes 9 and 10 engage the collector rings of the armature 7, and one of the brushes 9 is connected to a contact 11 which provides a terminal for one of the regulator connections. The other brush 10 is connected to the frame 6 by an electrical connection 12, and the frame of the generator is connected to the ground or frame of the vehicle as at 13.

The opposed pole pieces 8 are provided with the usual field windings 14 and 15 which are connected together as at 16 as usual, with the field winding 14 being electrically connected to the brush 9 as at 17, and the opposite end of the field winding 15 connected to a terminal 18 insulated from the frame 6, in substantially the same manner as the terminal 11. The invention is intended for use in connection with a three brush shunt wound generator, in which case, the connection 17 would be connected to a third brush, instead of the brush 9.

The invention includes a three unit regulator generally designated 20 having a reverse current cutout generally designated 21, a current regulator generally designated 22 and a voltage regulator likewise generally designated 23, arranged in side by side relation on the base 24. The base 24 is formed of a pressed metal stamping to provide side and end portions 25, and the end portions 25 are provided with wings 26 having openings 27 for receiving fastener elements in order to attach the regulator to the engine side of the dashboard beneath the vehicle hood. The base 24 is secured to the vehicle dashboard or frame so that it will extend vertically as shown in Figure 2. The base 24 is provided with contact terminals 29, 30 and 31 which are adapted to be electrically connected to the battery (not shown), and to the contacts 11 and 18 respectively by cables 32 and 33.

The reverse current cutout 21 includes a magnet 34 having a core 35 provided with a pair of windings 36 and 37 illustrated diagrammatically in Figure 4. An electrical conductor is connected to the windings 36 and 37 as at 38, and is connected to the winding 40 of the current regulator 22. The other side of the winding 40 is connected by a lead line 41 to the terminal 30 so that the generator output current will flow from the generator terminal 11, through the coil 40 and the windings 36 and 37 of the reverse cutout 21. The opposite end of the coil 36 is connected to a movable armature 43 having a pair of contact arms 44 which engage a pair of contacts 45 fixed to the base 20 and supported by an upstanding bracket 46 attached thereto. The armature 43 is rockably mounted on a bracket 47 and a spring arm 48 is attached to the armature 43 and engages a projection on the magnet 34 to normally hold the contacts 44 out of engagement with the contacts 45 suported on the bracket 46. A battery B is diagrammatically illustrated in Figure 4 and has its positive pole connected to the terminal 29 and its negative pole connected to the ground or frame connection G. Thus, current from the generator 5 flows from the terminal 11 through the coil 40, electrical connection 39 and through the windings 36 and 37 of the cutout 21. When current is flowing from the generator the armature 43 is attracted by the core 35 which closes the contacts 44 and 45 and permits the charging current to flow to the battery B. The circuit being completed through the ground or frame G. When the generator output drops below the battery potential the current flows through the coil 36 and also the coil 37 to the ground or frame connection G through the electrical connection 50. When this occurs the winding 37 neutralizes the winding 36 and contacts 44 separate from engagement with the contacts 45 and prevent the battery from discharging through the generator.

The current regulator 22 includes a magnet 51 having an iron core 52 (Figure 4) for receiving the winding 40 and mounted at one end of the core 52 is an armature 53 which is rockably mounted on a bracket 54 secured to the base 24 and insulated therefrom. The armature 53 is provided with spaced arms 55 the ends of which are connected to coil springs 56 to urge the armature 53 and its contact 57 upwardly into engagement with a contact 58 on the underside of a bracket 59. The contact bracket 59 is supported by an angle bracket 60 secured to the base 24 and likewise insulated therefrom. Thus it will be seen, that when the winding 40 is energized above a predetermined current value the armature 53 will be attracted by the core 52 to separate the contacts 57 and 58. The contacts 57 and 58 are in series with the contacts of the voltage regulator 23 in a manner which will be hereinafter more fully described.

The voltage regulator 23 (Figs. 1 and 2) includes an iron core 65 which is attached to the base 24 to project outwardly therefrom horizontally. The iron core is provided with a series winding 66 and a voltage winding 67 therebeneath illustrated diagrammatically in Figure 4. The voltage winding 67 has one of its ends grounded to the vehicle frame by an electrical connection 68, while the other end of the winding is electrically connected to the generator output terminal 30 and to the cable 41 by a lead wire 69. The series winding 66 has one of its ends connected to the regulator field terminal 31 by a lead wire 71, and as previously explained the field terminal 18 of the generator 5 is connected to the terminal 31 by means of an electrical cable 33 which is attached to a screw connector 72 on the terminal 31.

Mounted within the stamping or base 20 is an electric resistance element of approximately 20 ohms, and said resistance is diagrammatically illustrated in Figure 4 as at 73. One terminal of the resistance element is connected by a lead wire 74 to the field terminal 31 of the regulator, and the other end is connected to the ground frame G by means of an electrical connection 75.

The other end of the series winding 66 is electrically connected to the bracket 60 by means of an electrical cable 76 which, as explained before, supports the contact arm 59 on the underside of which is provided an electrical contact button 58.

Secured to the iron core 65 of the voltage regulator 23 is the base 78 of a spring clip structure including a pair of yielding spring arms 79 (Fig. 2), and slidably and adjustably mounted between said spring arms 79 is a hermetically sealed magnetically operated liquid contact switch generally designated 80. The sealed-in magnetically operated switch 80 includes a glass tube 81 having a nipple-shaped end 82, and a terminal end 83. Supported in the terminal end 83 is a fixed contact arm 84 which extends the entire length of the tube 81 and has its free end bent as at 85 for contacting a globule of mercury 86 in the nipple-shaped end 82. Also anchored in the terminal end 83 of the tube is a terminal 87 which has its inner end bent as at 88 to form a transversely extending portion 89. Secured to the transverse portion 89 is a flat spiral spring 90, the outer end of which as at 91 is connected to an armature plate 92 which carries a stop pin 93 adapted to engage the inner wall of the glass tube 81 to limit movement of the armature plate 92 in one direction. Secured to the armature plate 92 and movable therewith is a contact arm 94 which is adapted to move into and out of engagement with the mercury globule 86, and thus make and break an electrical circuit through the terminals 84 and 87. The terminal 84 is provided with an electrical conductor 95, while the terminal 87 is provided with a conductor 96. The conductor 95 is electrically connected to the armature 53 of the current regulator 22 (Figs. 1 and 4), while the electrical conductor 96 is grounded by being soldered to a bracket arm 97 as at 98. The bracket arm 97 is connected to the frame or housing 20 to provide a return or ground connection G (Figs. 2 and 4).

A condenser 99 has one of its terminals grounded as at 100, and its opposite terminal or lead is connected to the supporting bracket 54 of the voltage regulator 22.

Thus, it is seen that the sealed-in magnetic liquid contact switch 80 has its terminals in series with the contacts 57 and 58, and the series winding 66 of the voltage regulator. Hence, separation of the contacts 57 and 58 will place the resistance elements 73 in the external field circuit and reduce the generator output. Similarly, separation of the contact 94 from the mercury globule 86 will also interrupt the circuit through the series coil 66 and place the resistance element 73 in the generator external field circuit.

The current regulator 22 and voltage regulator 23 do not operate in unison. That is to say, that the contacts 57 and 58 and the contacts 85 and 94 do not open and close at the same time. The winding 40 is of relatively heavy wire and hence, provides a control for preventing the generator from exceeding a predetermined output value. In two brush shunt wound generators maximum generator output is attained at relatively low vehicle speeds. Hence, the current regulator will hold the output within certain limits by interposing the resistance 73 in the field windings of the generator to reduce the output. The voltage coil 67 of the voltage regulator produces a magnetic flux which, with the magnetic flux created in the core 65 by the winding 66, is sufficient to attract the armature plate 92 and interrupt the external field circuit for the interposition of the resistance element 73 therein. The resistance element is thus placed in the field winding circuit intermittently many times a second after the battery has become fully charged to thus reduce the generator output and prevent damage to the battery B.

The magnetic hermetically sealed liquid contact switch 80 can be adjusted by moving the glass tube 81 about its axis or longitudinally so as to increase or decrease the gap between the end of the core 65 and the armature plate 92. Thus, the voltage regulator can be set and adjusted to operate within very close voltage limits.

By reason of the fact that the contacts 85 and 94 are sealed-in and the circuit of the generator field windings is controlled by the liquid contact between the contact arm 94 and mercury globule 86, the contact 94 will remain in a clean condition and thus overcome the disadvantages above referred to.

The contacts 57 and 58 of the current generator can likewise be replaced by means of a magnetic hermetically sealed liquid contact switch such as the one shown and described as at 80 in connection with the voltage regulator 23. However, the contacts 57 and 58 do not experience the same conditions as the contacts 86 and 94. This is due to the fact that the current regulator 22 only operates to prevent the generator from exceeding a safe output when the voltage is lowered below the setting of the voltage regulator 23.

It will thus be seen, that when current is used for vehicle lights, radios and heaters, the battery voltage B will drop in proportion to the amount of current being used, and the constant voltage maintained at the regulator 23 for the battery is able to force more current through the resistance of the battery and thus compensate for the current being used. Since the magnetic liquid contact switch 80 permits such a fine adjustment and does not introduce additional resistance in the external generator field winding circuit, such voltage may be maintained practically constant throughout the use or life of the voltage regulator.

In addition, arcing of the voltage regulator contacts is prevented, which eliminates electrical disturbances in radio equipment as previously explained.

During the normal operation of the voltage regulator 23 when the battery B is fully charged or nearly so, the contact arm 94 oscillates to and fro and intermittently engages the mercury globule 86. The flat spiral spring 90 is arranged to yieldingly urge the armature plate 92 in a direction away from the magnetic force or pull exerted by the iron core 78 when the series winding 66 is energized.

While the invention has been described in connection with a three unit regulator which is commonly used on present-day motor vehicles, it is understood that it can be used in connection with voltage regulators of all types where resistance is intermittently interposed in the external field winding circuit of a generator to reduce the generator output by reducing the current flowing through the field coils with the reduction in the magnetic flux between the generator poles.

It is to be understood that the form of the invention herewith shown and described is to be taken as a preferred embodiment, and that various changes in the shape, size and arrangement of the various parts of the voltage regulator and its corresponding hermetically sealed liquid contact magnetic switch may be resorted to without departing from the spirit of the invention or the scope of the subjoined claims.

I claim:

1. In a voltage regulator, in combination with a generator having an external field circuit, an electro-magnet having a winding connected in the external field circuit of said generator, a hermetically sealed circuit maker and breaker in series with said external field circuit and winding, an armature on said circuit maker and breaker arranged to be attracted by said electromagnet when the same is energized to break the circuit through said circuit maker and breaker, a flat coil spring of hair spring sensitivity opposing the attraction of said electro-magnet, and a resistance element in shunt with said winding and circuit maker and breaker.

2. In a voltage regulator, in combination with a generator having an external field circuit, an electro-magnet having a series winding connected in the external field circuit of said generator, a hermetically sealed liquid contact circuit interrupter in said field circuit in series with said winding having an armature arranged to be attracted by said electro-magnet to interrupt the external field circuit, a hair spring of delicate sensitivity connected to said armature to oppose the attraction of said electro-magnet, and a resistance element connected in shunt with said circuit interrupter and winding.

3. In a voltage regulator, in combination with a generator having an external field circuit, an electro-magnet having a winding connected in series with the external field circuit of said generator, a hermetically sealed liquid contact circuit interrupter in said field circuit connected in series with said winding having an armature arranged to be attracted by said electro-magnet to move one of the contacts out of engagement with a globule of mercury in said interrupter, said armature being positioned adjacent the core of said electro-magnet to be attracted thereby when the electro-magnet is energized beyond a predetermined limit, a hair spring of delicate sensitivity connected to said armature to oppose the attraction of said electro-magnet, and a resistance element connected in shunt with the circuit interrupter and series winding.

4. In a voltage regulator, in combination with a generator having an external field circuit, an electro-magnet having a series winding connected in the external field circuit of said generator, a hermetically sealed container supported on one end of said electro-magnet, a globule of mercury in said container, a movable contact arm yieldingly urged into engagement with said globule of mercury, a hair spring of delicate sensitivity urging said arm into engagement, an armature plate on said arm arranged to be attracted by said electro-magnet and move said arm out of engagement with said mercury when the plate is energized beyond a predetermined limit, said contact arm and globule of mercury being electrically connected in series with said winding and a resistance element in shunt with said winding and contact arm.

5. In a voltage regulator, in combination with a generator having an external field circuit, an electro-magnet having a winding connected in the external field circuit of said generator, a U-shaped clip comprising a pair of spring arms mounted on the core of said magnet, a hermetically sealed-in liquid contact circuit maker and breaker mounted in said clip and connected in said field circuit in series with said winding, said circuit maker and breaker including a container having a globule of mercury therein, a switch arm in said container yieldingly urged into engagement with said globule, a hair spring of delicate sensitivity urging said arm into engagement with said globule, an armature plate on said arm arranged to be attracted by said electro-magnet when the winding is energized, a resistance element connected in shunt with said winding and circuit maker and breaker, and a condenser connected electrically across said circuit maker and breaker, said container being revolvable and slidable in said clip to vary the distance between said armature and electro-magnet.

6. In a voltage regulator, in combination with a generator having an external field circuit, an electro-magnet having a winding connected in the external field circuit of said generator, a U-shaped clip comprising a pair of spring arms on the core of said magnet, a hermetically sealed container adjustably supported by said spring arms, a movable contact arm in said container yieldingly urged into engagement with a globule of mercury in said container, an armature plate on said arm arranged to be attracted by the electro-magnet when the winding is energized, said arm and globule of mercury being connected in series with the winding in the external field circuit and a fixed resistance element connected in shunt with said winding and contact arm, said container being revolvable and longitudinally slidable in said clip to vary the distance between said armature and electro-magnet.

7. In a voltage regulator, in combination with a generator having an external field circuit, an electro-magnet having a coil winding connected in the external field circuit of said generator, a U-shaped clip comprising a pair of spring arms mounted on the core of said magnet, an electromagnetic liquid contact circuit interrupter comprising a hermetically sealed container supported in the clip and having a movable contact yieldingly urged into engagement with a globule of mercury in said container, a hair spring of delicate sensitivity urging said movable contact into engagement with said mercury, electrical connections connecting said movable contact and globule of mercury in series with the coil winding of the magnet, an armature plate on the movable contact arranged to be attracted when the magnet is energized to move said movable contact out of engagement with the mercury, a resistance unit shunted across said winding and the contacts of said magnetic liquid contact switch, whereby energization of the winding will attract the armature plate and connect the resistance winding in the external field circuit, said container being revolvable and longitudinally slidable in said clip to vary the air gap between said armature and electro-magnet.

8. A secondary battery charging generator system, having in combination a generator with an external field circuit, an electro-magnet having a winding in series with the external field circuit of the generator, a pair of yielding spring clips supported on the core of said magnet, a hermetically sealed glass container adjustably supported between said spring clips, fixed and movable contact members in said container, a globule of mercury in said container to provide a liquid contact between said fixed and movable contact members, a vibrating hair spring of delicate sensitivity urging said movable contact into engagement with said mercury, electrical connections connecting said contacts in series with the electro-magnet winding in the external field circuit, electrical connections connecting the generator output terminal to the battery, a voltage coil connecting said terminal for producing partial energization of the electro-magnet and a resistance element connected to said external circuit and adapted to be placed in the external circuit when the movable contact is moved out of engagement with the globule of mercury upon full energization of the windings of said magnet, whereby the voltage output of the generator will be regulated to supply a constant voltage to the battery by eliminating resistance in the external field circuit of the generator when the fixed and movable contacts are in engagement.

GEORGE VAN ZALE.

References Cited in the file of this patent

UNITED STATES PATENTS

| Number | Name | Date |
|---|---|---|
| 1,875,041 | Leece | Aug. 30, 1932 |
| 2,218,109 | Hochstetter | Oct. 15, 1940 |
| 2,306,893 | Menzel | Dec. 29, 1942 |
| 2,307,025 | Creveling | Jan. 5, 1943 |
| 2,310,514 | Callender | Feb. 9, 1943 |
| 2,325,785 | McCabe | Aug. 3, 1943 |
| 2,336,326 | Weckerly | Dec. 7, 1943 |
| 2,469,092 | Webb | May 3, 1949 |
| 2,491,986 | Larson | Dec. 20, 1949 |
| 2,503,089 | Binford | Apr. 4, 1950 |
| 2,524,261 | Kaminky | Oct. 3, 1950 |
| 2,564,655 | Binford | Aug. 21, 1951 |
| 2,576,561 | Binford | Nov. 27, 1951 |

OTHER REFERENCES

Ser. No. 434,042, Menzel (A. P. C.), published May 18, 1943.